B. F. COWAN.
Stove Pipe Damper.
No. 56,379. Patented July 17, 1866.
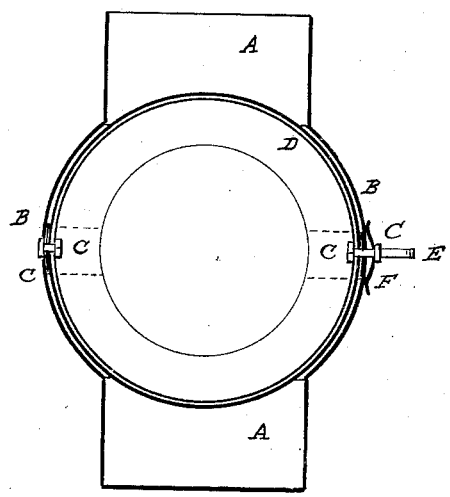
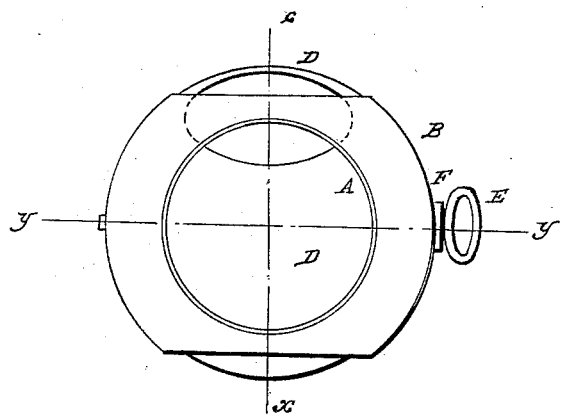
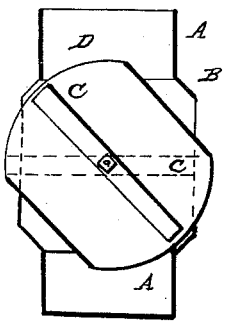
WITNESSES.
INVENTOR.

UNITED STATES PATENT OFFICE.

B. F. COWAN, OF NEW YORK, N. Y.

STOVE-PIPE DAMPER.

Specification forming part of Letters Patent No. 56,379, dated July 17, 1866.

*To all whom it may concern:*

Be it known that I, B. F. COWAN, of the city, county, and State of New York, have invented a new and useful Improvement in Stove-Pipe Dampers; and I do hereby declare that the following is a full, clear, and exact description thereof, which will enable others skilled in the art to make and use the same, reference being had to the accompanying drawings, forming a part of this specification, in which—

Figure 1 is a sectional elevation of a damper made according to my invention and applied to a pipe, the line of section being in the plane $y$, Fig. 2, but showing the damper closed to the pipe. Fig. 2 is a plan. Fig. 3 is a view on a line, $x$, at right angles to the view given in Fig. 1, and it shows the damper partly open to the pipe and also to the atmosphere.

Similar letters of reference indicate like parts.

This invention has for its object to improve stove-pipe valve-dampers. The damper is a hollow spheroid, and revolves within an enlargement of the same shape made in the pipe where it is used. The flattened sides of the damper and of the enlargement in which it revolves are parallel with each-other, and are also open.

The damper is suspended from points which are midway from its flattened sides, and its place of suspension in the pipe is likewise midway of the flattened sides of its enlargement, so that when their flattened sides coincide with each other an opening is found through the pipe and through the damper from side to side, and communication between the lower part of the pipe and the upper part is interrupted.

The letters A A designate the pipe, and B is a circular enlargement therein, whose opposite sides are removed, as shown, so as to produce an open spheroidal chamber, its open sides being parallel with each other. This enlargement is strengthened by narrow plates C C, soldered or riveted within it at right angles with the axis of the pipe. Within this enlargement I place a hollow spheroidal valve-damper, D, which is suspended in the plane of the axis of the stove-pipe, so as to be perfectly balanced, its oblate sides being parallel and open.

The diameter of the damper is such as to allow it to be revolved within the enlargement B without rubbing against its interior.

The damper is also braced within by a plate or ring, C, to stiffen it and to prevent its symmetry from being easily destroyed by unequal expansion or contraction, or by other causes.

The damper may be suspended within the enlargement on an axis which shall pass through them, or, as in this example, upon two axial bolts or pivots extending inward from the enlargement B, one of said bolts being expanded outside into a handle or thumb-piece, E, between which and the pipe is an elliptical spring, F, one of whose ends is fastened to the pipe, the other being left free. The action of the spring is to produce friction to insure the steadiness of the valve and prevent it from being rotated by accident—as, for instance, by sudden jars.

The valve or damper is so made and arranged as to be perfectly balanced on the bolts or pivots at its ends for the purpose of keeping it in whatever positions it is brought to by operating the handle E.

When the damper stands so that its flattened sides coincide with those of the enlargement B the pipe is closed to the passage of smoke, excepting so far as is allowed by the narrow space left between the outside of the damper and the inside of the enlargement. At this time, also, an opening is presented laterally through the pipe and damper from side to side.

When the damper is rotated through one-quarter of a revolution from the last-mentioned position the open sides of the enlargement B are wholly closed by the solid sides of the damper and the smokeway of the pipe is unobstructed, the diameter of the openings in the sides of the damper being in this example of the same size as the diameter of the pipe; but it may be less than the diameter of the pipe.

When the damper is turned less than a quarter of a revolution openings of crescent shape for the passage of smoke are left in the upper and lower parts of the enlargement, but on opposite sides of the pipe, as seen in Fig. 3, and like openings are left at the open sides of the enlargement for the admission of air from without. The latter openings are diagonal in their positions, one being at the lower side and the other at the upper side of the enlargement.

By means of this construction and arrangement I provide a double-acting, rotating, balanced valve-damper by means whereof a fire can be perfectly regulated by controlling the energy of the draft, and an apartment be perfectly ventilated by openings in the pipe to carry away vitiated air, both operations being effected at the same time, and being also effected in such a manner that the smoke-currents are assisted by the incoming air, the smoke-openings on each side, when the apparatus is in the position seen in Fig. 3, being contiguous to the air-openings, so that the currents of smoke and of the incoming air can mingle without obstructing or hindering each other in their course and without abrupt deflections.

My improvement can be varied in form without departing from the principle thereof; and it is not necessary that the damper shall be spheroidal, providing its form is such as to close both the smoke and air passages when it is rotated.

Having thus described my invention, I claim as new and desire to secure by Letters Patent—

1. The rotating spheroidal valve-damper above shown, constructed and operating substantially as described.

2. The rotating damper above shown, in combination with openings in both sides of that part of the pipe within which the damper revolves, substantially as described.

B. F. COWAN.

Witnesses:
ANDREW J. TODD,
W. TREWIN.